US011503902B1

(12) United States Patent
Burris (10) Patent No.: US 11,503,902 B1
(45) Date of Patent: Nov. 22, 2022

(54) DENTAL APPLIANCE CLEANER

(71) Applicant: Brison Burris, Suwanee, GA (US)

(72) Inventor: Brison Burris, Suwanee, GA (US)

(73) Assignee: Brison Burris, Atlanta, GA (US)

( * ) Notice: Subject to any disclaimer, the term of this patent is extended or adjusted under 35 U.S.C. 154(b) by 294 days.

(21) Appl. No.: 16/852,489

(22) Filed: Apr. 19, 2020

(51) Int. Cl.
| | | |
|---|---|---|
| *A46B 13/00* | (2006.01) | |
| *A46B 11/00* | (2006.01) | |
| *A46B 13/04* | (2006.01) | |
| *A46B 9/06* | (2006.01) | |
| *A46B 13/08* | (2006.01) | |
| *A46B 15/00* | (2006.01) | |
| *B65D 43/02* | (2006.01) | |
| *A61C 17/00* | (2006.01) | |
| *A61C 17/34* | (2006.01) | |

(52) U.S. Cl.
CPC ............ *A46B 11/0062* (2013.01); *A46B 9/06* (2013.01); *A46B 13/001* (2013.01); *A46B 13/04* (2013.01); *A46B 13/08* (2013.01); *A46B 15/0097* (2013.01); *A61C 17/036* (2013.01); *A61C 17/3436* (2013.01); *B65D 43/0204* (2013.01); *A46B 2200/30* (2013.01)

(58) Field of Classification Search
CPC . A46B 11/0062; A46B 13/001; A46B 13/041; A46B 13/04; A46B 13/08; A61C 17/036; A61C 17/3436; A61C 17/00
See application file for complete search history.

(56) References Cited

U.S. PATENT DOCUMENTS 4,984,323 A * 1/1991 Digby .................... A46B 9/04
15/21.1

FOREIGN PATENT DOCUMENTS

WO    WO-2019180602 A1 * 9/2019

* cited by examiner

*Primary Examiner* — Shay Karls (57) ABSTRACT

The present invention discloses a system and method related to the field of dentistry, specifically dental appliances such as retainers, dentures, grills and athletic mouth-wear and is proposed to provide advanced assembly in providing assistance in cleaning the appliances through improved measures. Currently, there are cleaning methods for retainers and dentures, however they only include liquid solution methods without automatic moving bristles. As per the present art, users soak their retainers or dentures in the solution and then are required to use a toothbrush to scrub off excess liquid solution or built-up plaque that was not dissolved by the solution, making the process too repetitive and time consuming. Additionally, the toothbrush does not provide automatic circular motion, which is preferred in order to produce retainers or dentures that are plaque-free and completely transparent. Finally, appliances can be damaged and break when using a handheld technique with a toothbrush due to lack of support and stability for the appliance. This cleaning device takes into consideration these deficiencies and corrects them to make the process more effective and convenient for all users in any environment.

5 Claims, 6 Drawing Sheets

DENTAL APPLIANCE CLEANER

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves copyright rights whatsoever.

FIELD OF THE INVENTION

The present invention relates to the field of dentistry specifically through removable dental appliances such as retainers, dentures, grills and athletic mouth-wear and is particularly related to a system and procedure to clean oral deposits from teeth using an effective and convenient manner through an improved process.

BACKGROUND OF THE INVENTION

Currently, there exist cleaning methods for retainers, dentures and other dental appliances. However, they only include liquid solution methods without automatic moving bristles. As a result, patients are using the liquid solutions to soak their retainers, dentures, mouth guards, and mouth jewelry, but then require a toothbrush to scrub off excess liquid solution or built-up plaque that was not dissolved by the solution. The toothbrush does not provide the repetitive, circular motion, which is preferred in order to produce retainers or dentures that are plaque-free, clean and completely transparent. There are multiple inventions that have been proposed in prior art regarding the cleaning of retainers and dentures. For instance, a method of cleaning dentures using aerated foams bearing U.S. Pat. No. 4,511,486A is issued to Richardson-Vicks Inc. The patent discloses a foam-able liquid denture cleanser and deodorant comprising surfactant, humectant, water and an appreciable amount of ethanol or isopropanol. Flavoring, sweetening, coloring, scenting and the like ingredients are optionally added. The cleanser is applied to dentures as a foam from a conventional foam-dispensing device.

An apparatus and method for denture cleaning storage bearing French patent WO2,001,040,076A1 is issued to Sandra Graham. The patent discloses a storage and cleaning apparatus for dentures comprising a plastic bag (8). The plastic bag includes a top end (81), a bottom end (82), and two side edges (83, 84). The plastic bag also includes a triage of reusable seals, the triage being located near the top end and includes an upper seal (41), a middle seal (42), and a lower seal (43), with each of the seals including a male portion (26) and a female portion (28), and each of the seals extending parallel to each other and located approximately one centimeter or one-half inch from each other. In addition, the apparatus includes a cleaning agent assembly (6), with that assembly located on the inside of the plastic bag. The apparatus also includes a release valve (2) incorporated into a side edge of the plastic bag, and includes pleats (10) located on the lower half of each side edge of the plastic bag.

A methods and solutions for cleaning dentures bearing U.S. Pat. No. 5,980,641A is issued to Henryk P. Jakubowski. The patent discloses a method for cleaning dentures in which a solution of about 5% carboxylic acid, an artificial sweetener and a flavoring is prepared. The dentures are placed therein and agitated. After agitation, the dentures are removed from the solution and can be inserted into a wearer's mouth immediately without being rinsed, brushed or soaked. The solution is prepared by placing an amount of 25% of carboxylic acid solution in an amount of water equivalent to five times the amount of the 25% carboxylic acid solution or filling a receptacle with a known amount of water and placing a tablet having the sweetener, flavoring and an amount of carboxylic acid sufficient to provide the amount of water with a 5% carboxylic acid concentration into the receptacle. If used in combination with an ultrasonic cleaning apparatus, the solution is placed in a tank of the ultrasonic cleaning apparatus, and an ultrasonic transducer in the ultrasonic cleaning apparatus directs ultrasonic vibrations into the tank to agitate the dentures.

A Method of cleaning dental appliances and artificial dentures bearing U.S. Pat. No. 4,806,173A is issued to Sameeh S. Toukan. The patent discloses a simple, effective and inexpensive method for cleansing dental appliances that includes the immersion of the artificial denture in a diluted aqueous solution of a carboxylic acid having the structure R(Z)COOH, where "R" is a hydrocarbon chain and "Z" is a hydroxy, a halo or aryl radical.

A cleansing of dentures bearing U.S. Pat. No. 3,822,212A is issued to K Bryant, B Eddleman. The patent discloses a method and apparatus for cleaning dentures characterized by removing the dentures from the mouth, spraying a denture cleaning solution on the dentures, brushing and rinsing the dentures and returning them to the mouth of the wearer without the effective cleaning thereof. Also disclosed, are preferred embodiments delineating specific denture cleaning solutions and an apparatus for spraying the denture cleaning solution onto the dentures.

A cleaning tablet for dentures and a method for producing thereof bearing European patent EP02489,36A1 is issued to EP0248936A1. The patent discloses an invention related to a cleaning tablet for the automatic cleaning of dentures in an aqueous solution, sub-divided into two layers with different compositions, that shows a change of pH from acidic to alkaline during the dissolving process of the tablet in water, as well as a method for producing such a cleaning tablet.

A denture cleansing tablet and method of manufacturing the same bearing US patent U.S. Pat. No. 4,217,234A is issued to KUKIDENT RICHARDSON-MERRELL & Co KG GmbH. The patent discloses a fast-acting (3-5 min.) denture-cleansing tablet for use in aqueous solutions to automatically clean dentures and is comprised of a mixture containing gas-forming materials, organic and inorganic calcium bonding materials, oxidizing materials, surfactant materials, carriers, lubricants and flavoring materials. Fast cleansing action and short decomposition times are obtained by including amidosulfonic acid, ethylene diamine tetraacetic acid, dialkyl thiourea, and a non-ionogenic fluorochemical material in an amount sufficient to achieve the pH level needed in a 1% solution of such formulation in water of 6.3 to 6.5.

An ultrasonic denture cleaning system bearing U.S. Pat. No. 5,421,353A is issued to Henryk P. Jakubowski. The patent discloses a method and an apparatus for cleaning an object in a cleaning solution and then rinsing the object in a rinse solution. The apparatus includes a cleaning tank with an inlet valve and an outlet valve. The object to be cleaned and the cleaning solution are placed into the cleaning tank. An ultrasonic transducer generates ultrasonic vibrations in the cleaning solution. A controller maintains the object immersed in the cleaning solution for a first period of time and then generates ultrasonic vibrations for a second period of time. The outlet valve is then opened to drain the cleaning solution from the tank. The inlet valve is subsequently opened to fill the cleaning tank with a rinse solution. The apparatus is particularly suited for cleaning dentures with a rinse solution and the cleaning solution being selected to properly hydrate acrylic denture material and soft reline materials.

A gel denture cleanser composition and method of application bearing U.S. Pat. No. 4,807,649A is issued to Warner-Lambert Co LLC. The patent discloses a gel denture cleaner composition. The composition comprises a water-soluble detergent; a chelating agent; a gelling agent; optionally, a non-toxic glycol; and water. The composition has particular application on the removal of tartar and calculus as well as stains and plaque adhering thereto.

A liquid denture cleanser composition and method of application bearing U.S. Pat. No. 4,701,223A is issued to Warner-Lambert Co LLC. The patent discloses a sprayable liquid denture cleanser composition comprising an aqueous solution of a detergent selected from the group consisting of sulfonate, sulfated and sulfoacetate fatty alcohols, and a chelating agent of the amino carboxylate or organo phosphonate type. The cleanser is preferably dispensed from a mechanical non-aerosol spraying device such that the force of the spray supplements the cleansing effect of the composition. The composition has particular application on the removal of tartar and calculus as well as stains and plaque adhering thereto.

The conventional toothbrush does not provide automatic circular motion, which is necessary in order to produce retainers or dentures that are plaque-free and completely transparent. In addition, the level surface provided by the bottom half of the cleaning device ensures that the user will not risk breakage of the mouthpiece, which can happen when one only cleans the piece in a handheld manner using a toothbrush without a stable platform to secure the mouthpiece in place during cleaning. The present invention seeks to extend the utility of a system of this class by providing a combination of physical embodiments to provide a new, unique design that will allow toothbrush-like bristles to move in an efficient, curricular motion to brush the removable mouth apparatus until clean with a stable structure and effective movement. The device is a two-piece plastic, circular container with round soft bristles in the interior top half of the structure that produces a circular, twisting cleaning motion.

None of the previous inventions and patents, taken either singly or in combination, is seen to describe the proposed invention as claimed. Hence, the inventor of the present invention proposes to resolve and surmount existing technical difficulties to eliminate the aforementioned shortcomings of prior art.

BRIEF SUMMARY OF INVENTION

In light of the disadvantages of the prior art, the following summary is provided to facilitate an understanding of some of the innovative features unique to the present invention and is not intended to be a full description. A full appreciation of the various aspects of the invention can be gained by taking the entire specification, claims, drawings, and abstract as a whole.

The objective of the invention is to provide an advanced system and procedures to provide a cleaning device with a new, unique design that will allow toothbrush-like bristles to move in a repetitive, curricular motion in order to deep clean the dental appliance until clear with a simple structure and movement More specifically, it is the principal object of this invention to provide a two-piece plastic circular container with round soft bristles in the interior, topside of the structure.

It is also the objective of the system to provide the outside of the bottom half of the structure with grip-like edges in order to avoid drops or spills of the present invention and its continents.

According to another aspect of the invention, it is also the objective of the invention to provide the top half of the plastic case with a twist-to-lock system allowing the user to spin the bristles around to clean the appliance, but also to lock the two halves together when used as a dental appliance container for transport.

It is further the object of the invention to provide four mini suction cups at the posterior end of assembly to keep the assembly in an upright position whether placed on a bathroom sink or counter top.

It is also a feature of the invention to provide an aesthetically pleasing assembly, which is available in multiple colors.

It is also the objective of the invention to provide a circular container, that will be made with a standard mold with an interior component made from five, flexible rubber pieces, aligned in a mouth-like configuration, that will aid in stabilizing the appliances in place during the moving of the bristles.

It is also the objective of the invention to add the electric motor with a rechargeable battery to the interior of the top half of the device to make the bristles spin in a curricular, elliptical motion, with a start/stop, on/off button.

It is further the objective of the invention to provide a timer with an automatic stop that will be used to increase the efficiency of use for this present invention.

According to another aspect of the invention, the architecture is suitable for any type of consumer.

According to another aspect of the invention, the product can be used for a longer period of time before having to be replaced, unlike other cleaning devices such as sonic wave cleaners where the solution has to be replaced after each wash.

Additionally, it can be utilized instantly and in any environment, even outside the home, when required, without affecting the cleaning capability of the device.

The present invention can be used as an appliance container. The mouthpiece can be set inside and the structure closed with the twist-to-lock mechanism.

Other aspects, advantages and novel features of the present invention will become apparent from the detailed description of the invention when considered in conjunction with the accompanying drawings.

This summary is provided merely for purposes of highlighting some sample embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following detailed description, figures, and claims.

BRIEF DESCRIPTION OF DRAWINGS

Non-limiting and non-exhaustive embodiments of the present embodiments are described with reference to the FIG. 1 depicts the two-piece cleaning device with the bristles in accordance with one or more implementations. FIG. 1 also depicts the gripping texture in accordance with one or more implementations.

DETAILED DESCRIPTION OF INVENTION

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The present invention is a system to provide new and improved methods for cleaning dentures, retainers, athletic mouthpieces and mouth jewelry by removing daily deposits and accumulations of plaque and food debris by an advanced assembly of bristles and circular, twisting motion.

Figure 1:
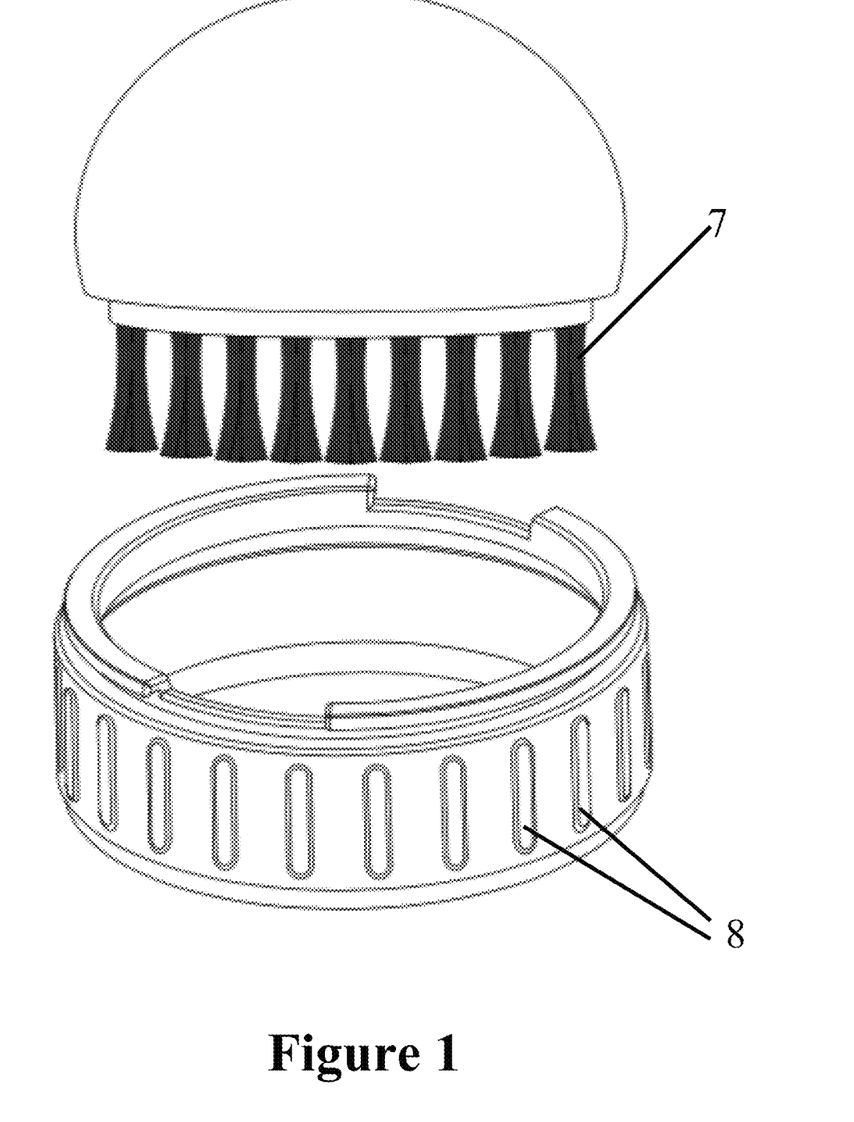

The present invention will now be described by referencing the appended figures representing the preferred embodiment. FIG. 1 presents a two-piece plastic circular container with one round soft bristle component (7), measuring between one to three inches long at the top, interior portion of the structure. It is also the objective of the system to provide the exterior of the bottom half of the unit with a gripping texture (8), in order to avoid drops or spills of the present invention and its contents.

Figure 2:
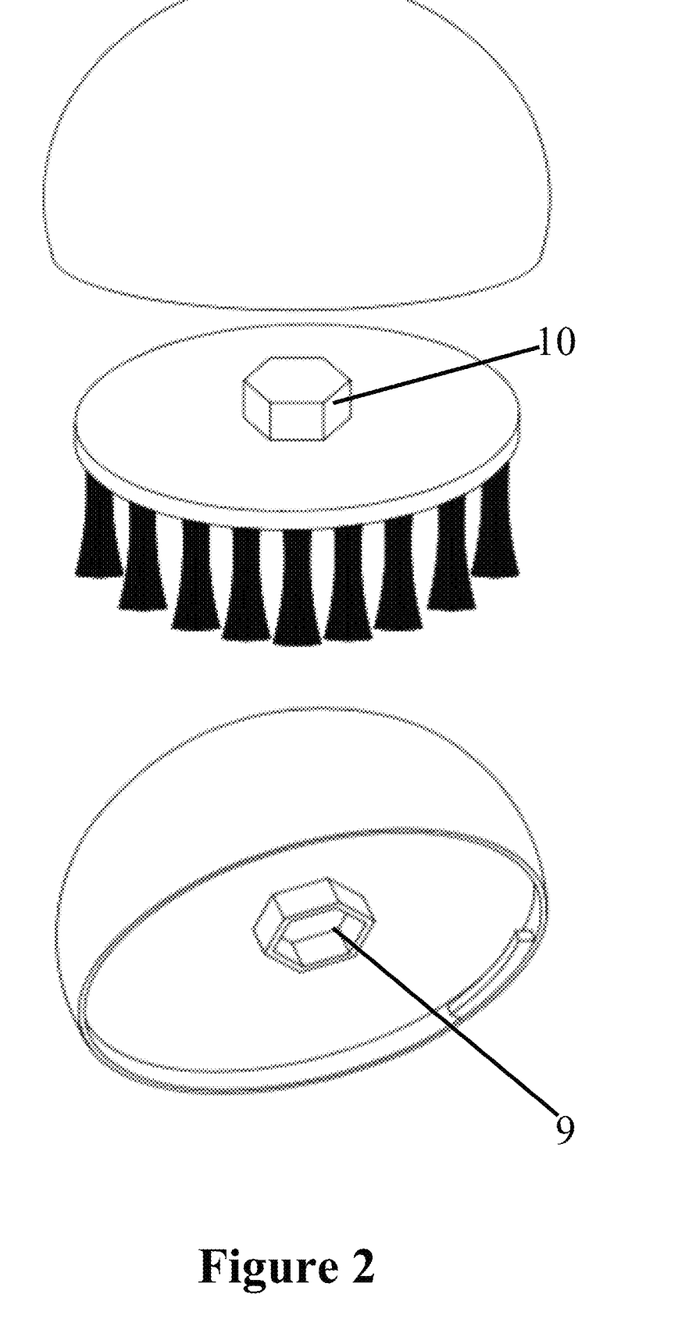
FIG. 2 depicts a system configured to allow for removable bristles in accordance with one or more implementations.

The bristle (7), will be replaceable, as shown in FIG. 2, giving the user the ability to keep the device sanitary and after wearing down the bristles overtime, the user can install a new set of bristles to optimize performance. The top of the bristles (10), will fit directly into the hexagon mold (9), in the dome of the device.

Figure 4:
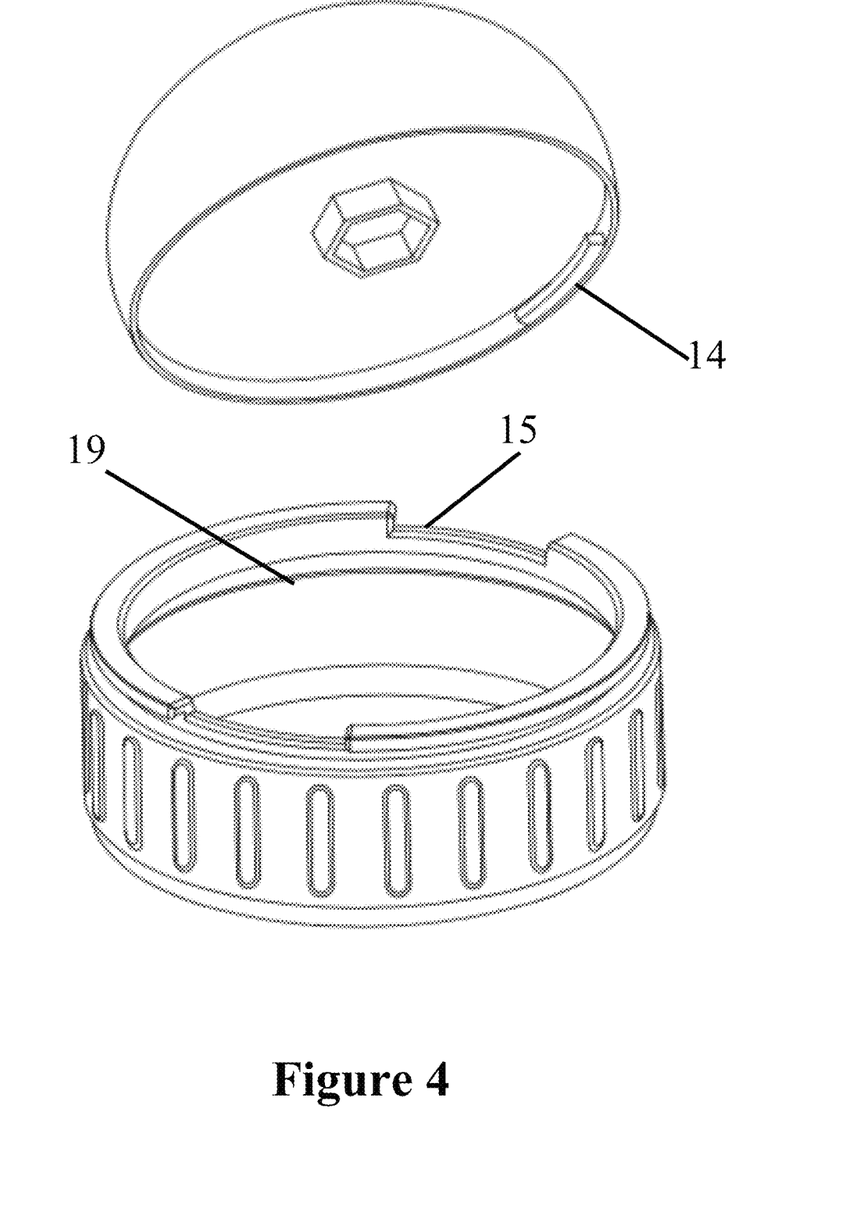
FIG. 4 depicts a twist-to-lock system configured in accordance with one or more implementations.
Figure 5:
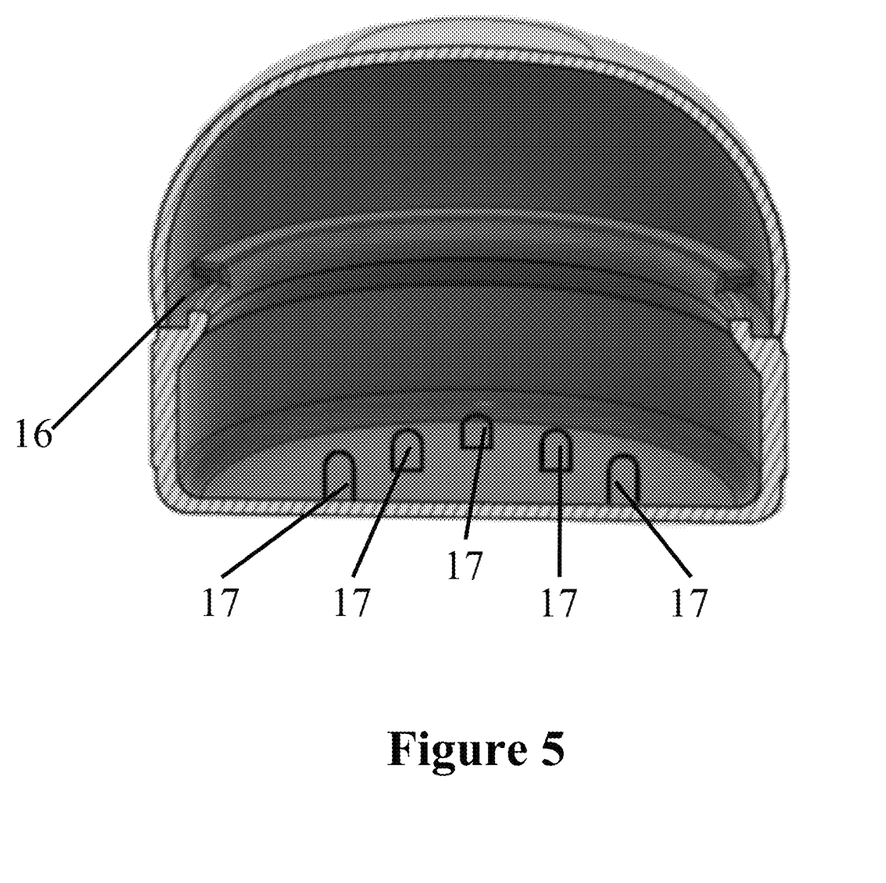
FIG. 5 further demonstrates the twist-to-lock system and depicts an additional system configured to hold the dental appliances in place while cleaning using five plastic molds arranged in a mouth-like formation in accordance with one or more implementations.

On the interior side of the bottom half of the plastic case, a twist-to-lock mechanism is proposed, as seen in FIGS. 4 and 5. This type of lock will allow the user to spin the bristles around to clean the dental appliances, but also lock it when used as a container. The lip (15), will lock into place with the extended edge (14). When not locked into place, the twisting in opposite directions will allow for a circular motion of the bristles (7). The mouthpieces can be set inside and closed with the twist-to-lock mechanism.

Figure 6:
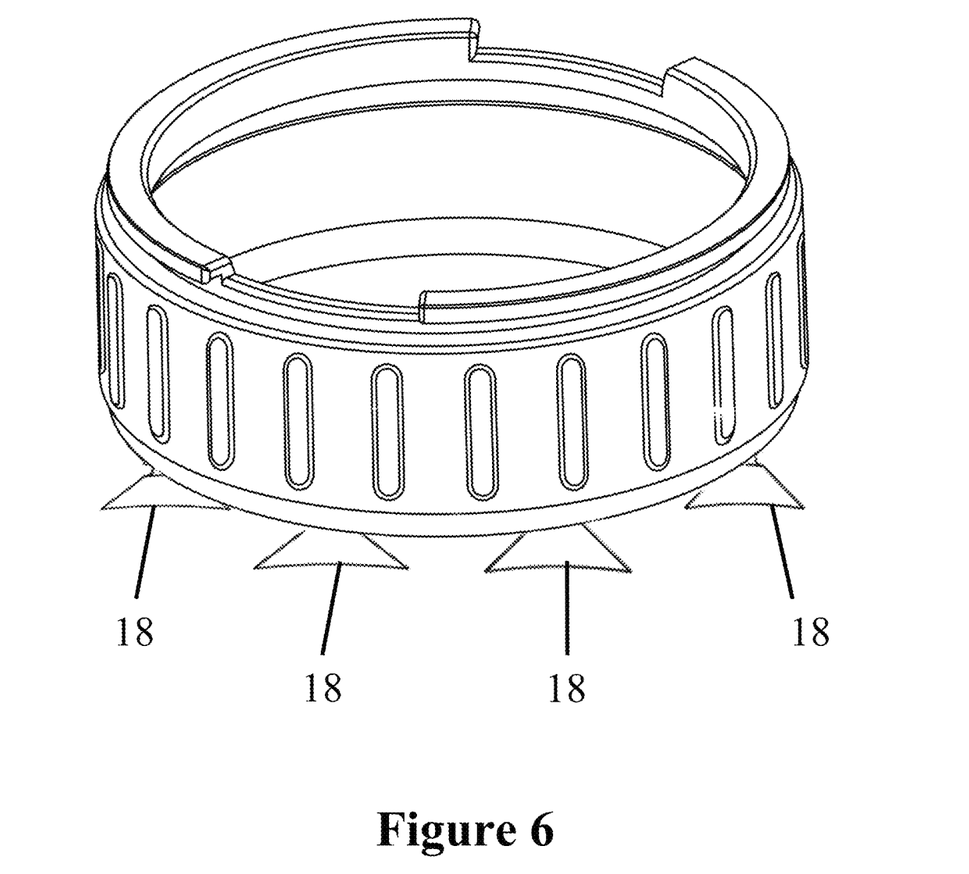
FIG. 6 depicts a method to keep the assembly in an upright position using small suction cups on the posterior end, in accordance with one or more implementations.

As pictured in FIG. 6, the exterior, bottom of the lower half is proposed to have four mini suction cups (18), positioned near the outer edges. These suction cups are designed to keep the proposed assembly in place on a bathroom sink or counter top, increasing the stability of the product.

The interior of the lower half of the container, as per its exemplary embodiments in FIG. 5, will contain a standard-size mold, to be made out of five flexible, rubber pieces (17). These rubber pieces (17), are aligned in a mouth-like configuration, which is to aid in stabilizing the dental appliances in-place during the moving of the bristles. The standard mold will allow larger and smaller appliances to be held in place equally since the mold is a general outline of a mouthpiece. These five pieces (17), will act as bumper guards for the appliance.

As per further embodiments of the invention in FIG. 4, a "fill-to" line (19), is planned in order to indicate the water required during the cleaning process.

Figure 3:
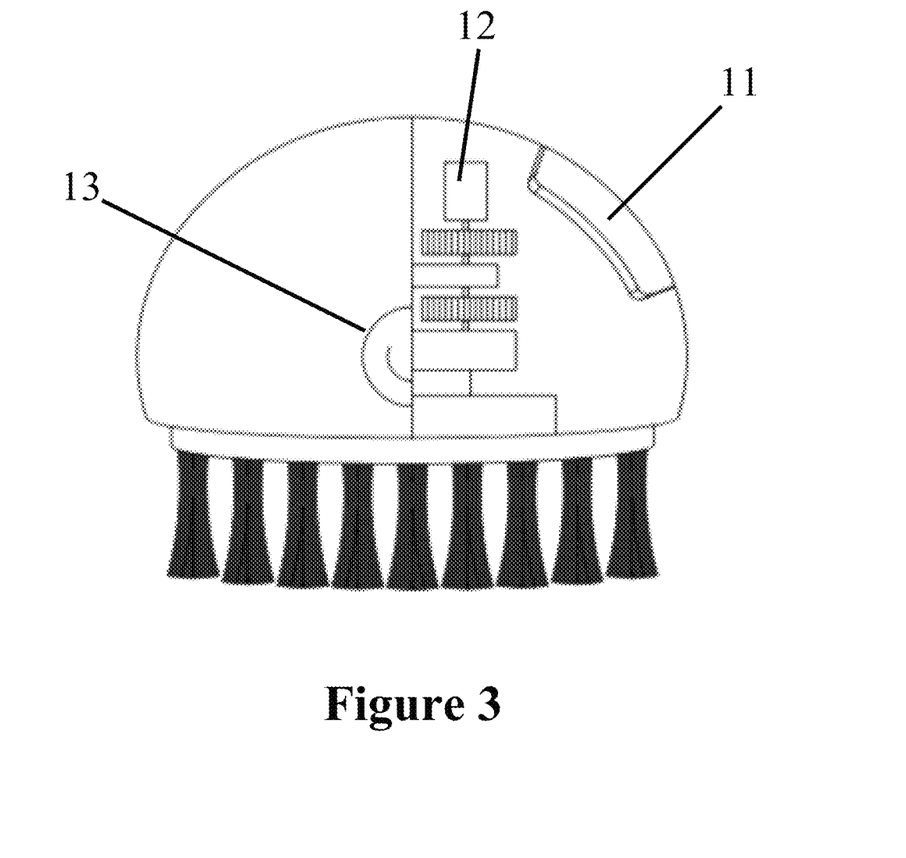
FIG. 3 depicts a system configured to provide an electric version of the device in accordance with one or more implementations.

It is further proposed to make the cleaning device as an electric apparatus as depicted in FIG. 3. This change will be achieved by adding the electric motor (12), to the interior, top half of the device to make the bristles spin in a curricular motion with a button (13), for start/stop, or on/off. A timer with an automatic stop after 15 seconds is also proposed to increase the efficiency of use for the present invention. The motor inside the top of the container (12), allows for spinning the toothbrush-like bristles that have the capability of cleaning plastic and metal retainers as well as dentures. It is further proposed that the electric motor operate with the use of a rechargeable battery (11), that is compartmentalized in the upper portion of the dome as seen in FIG. 3. This present invention can also be used as a dental appliance container.

It is further proposed to allow the complete removal of bottom half of the container so that excess water or used water can be released. The assembly of the device will make it simple to clean and sanitize. The bottom half of the device can be separated from the top half, as seen in FIG. 1, allowing the user to clean the bottom half, where most of the debris will accumulate, using anti-bacterial soap and water. Once washed, it should be rinsed, dried, reassembled with the top half.

The proposed use of the device starts once the mouth pieces are in place. The user will add water to the indicated "fill-to" line (19), and will add a drop of toothpaste, a solution cleaner tablet or any preferred type of cleaning agent on the top of the bristles (7). The depth of the bristles, between one to three inches will reach beyond the dental appliances in order to reach all sides, edges, and crevices. The two-piece round container with the twist-to-lock mechanism will allow the user to twist the container in opposite directions to create a curricular motion that will clean all facets of the appliances. The pressure created by the two-piece container with bristles (7), water, and a dynamic circular motion will scrub off all excess plaque, small food particles, and make the dental appliances transparent, free of particles and plaque.

The twist-to-lock mechanism will allow the user to lock the device when used as a mouthpiece holder. The user will simply put their appliances in the bottom half of the container, as seen in FIG. 1 and turn the two pieces until the lip inside the ring edge (15), locks into the extended edge piece (14).

While a specific embodiment has been shown and described, many variations are possible. With time, additional features may be employed. The particular shape or configuration of the platform or the interior configuration may be changed to suit the system or equipment with which it is used.

Having described the invention in detail, those skilled in the art will appreciate that modifications may be made to the invention without departing from its intent and purpose. Therefore, it is not intended that the scope of the invention be limited to the specific embodiment illustrated and described herein. Rather, it is intended that the scope of this invention be determined by the appended claims and their equivalents.

The abstract of the disclosure is provided to allow the reader to quickly ascertain the nature of the technical disclosure. It is submitted with the understanding that it will not be used to interpret or limit the scope or meaning of the claims. In addition, in the foregoing detailed description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the detailed description, with each claim standing on its own as a separately claimed subject matter.

The invention claimed is:

1. A removable dental appliance storage and cleaning apparatus comprising:
    a closed top portion comprising a first circular sidewall with at least two spaced apart edges and a central opening; and
    a planar bottom surface comprising, as a single component, a central protrusion and a plurality of bristles, the central protrusion adapted to detachably receive the central opening; and
    a circular base portion adapted to engage the closed top portion, the circular base portion comprising a second sidewall that engages the edges of the top portion, the second sidewall circumscribing a bottom surface to define a cavity, and at least one groove extending about the circumference of the second sidewall, the at least one groove adapted to receive the at least two spaced apart edges, thereby attaching the closed top portion to the circular base portion,
    wherein the attached portions are rotatable.

2. The removable dental appliance storage and cleaning apparatus of claim 1, comprising a liquid in the cavity of the circular base portion.

3. The removable dental appliance storage and cleaning apparatus of claim 1, wherein the circular base portion further comprises a raised portion interiorly circumscribing the cavity sidewall and at a height less than a height of the second sidewall to allow user to transport the removable dental appliance.

4. The removable dental appliance storage and cleaning apparatus of claim 1, wherein the closed top portion further comprises a motor configured to rotate the removable bristles.

5. The removable dental appliance storage and cleaning apparatus of claim 1, wherein the circular base portion further comprises a plurality of flexible pegs affixed within the cavity that can be adapted to snugly retain file user's removable dental appliance when in use such that the dental appliance remains stationary when in use.

* * * * *